(12) United States Patent
Crump et al.

(10) Patent No.: US 10,309,514 B2
(45) Date of Patent: Jun. 4, 2019

(54) NOISE, VIBRATION, AND HARMONICS REDUCING SPROCKET TECHNOLOGY

(71) Applicant: BorgWarner Inc., Auburn Hills, MI (US)

(72) Inventors: Matthew W. Crump, Cortland, NY (US); John Sarick, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 78 days.

(21) Appl. No.: 14/771,310

(22) PCT Filed: Feb. 18, 2014

(86) PCT No.: PCT/US2014/016829
§ 371 (c)(1),
(2) Date: Aug. 28, 2015

(87) PCT Pub. No.: WO2014/133823
PCT Pub. Date: Sep. 4, 2014

(65) Prior Publication Data
US 2016/0003340 A1 Jan. 7, 2016

Related U.S. Application Data

(60) Provisional application No. 61/771,300, filed on Mar. 1, 2013.

(51) Int. Cl.
*F16H 55/30* (2006.01)

(52) U.S. Cl.
CPC ....... *F16H 55/30* (2013.01); *F16H 2055/306* (2013.01)

(58) Field of Classification Search
CPC . F16H 55/16; F16H 2055/306; B62D 55/096; B62D 55/0963; B62D 55/0966
See application file for complete search history.

(56) References Cited

U.S. PATENT DOCUMENTS

| | | | | |
|---|---|---|---|---|
| 1,638,140 | A | * | 8/1927 | Best ..................... B62D 55/135 29/891.1 |
| 1,870,801 | A | * | 8/1932 | Engstrom .......... B62D 55/0963 474/156 |
| 3,499,340 | A | * | 3/1970 | Teranishi ................ B66B 23/02 198/330 |

(Continued)

FOREIGN PATENT DOCUMENTS

| | | |
|---|---|---|
| CN | 202100683 U | 1/2012 |
| DE | 10219831 A1 | 11/2003 |

(Continued)

OTHER PUBLICATIONS

International Search Report and Written Opinion dated Jun. 11, 2014; International Application No. PCT/US2014/016829; 12 pages.

(Continued)

*Primary Examiner* — Minh Truong
(74) *Attorney, Agent, or Firm* — BrooksGroup

(57) ABSTRACT

A number of variations may include a sprocket using one or more slot(s) and/or compressive or elastic material in order to lower the NVH. A number of variations may include a sprocket which isolates the vibrations created by the impact of the chain with the sprocket so that the vibrations are prevented from traveling into the shaft.

3 Claims, 6 Drawing Sheets

(56) References Cited

U.S. PATENT DOCUMENTS

| | | | | |
|---|---|---|---|---|
| 3,889,550 | A | * | 6/1975 | Boggs ................ B62D 55/0963 474/161 |
| 4,058,352 | A | * | 11/1977 | Sogge ................ B62D 55/0963 267/182 |
| 4,175,796 | A | * | 11/1979 | Boggs ................ B62D 55/0885 305/115 |
| 5,026,329 | A | | 6/1991 | Diekevers |
| 5,908,364 | A | | 6/1999 | Tanaka |
| 5,967,924 | A | * | 10/1999 | Kwon ..................... F16H 55/30 474/161 |
| 6,540,630 | B1 | * | 4/2003 | Oertley .............. B62D 55/0963 305/137 |
| 7,032,983 | B2 | * | 4/2006 | Wu ........................ F16H 55/14 305/195 |
| 7,052,424 | B2 | | 5/2006 | Kabrich et al. |
| 8,468,904 | B2 | * | 6/2013 | Nowicki ................ F16H 55/16 74/411 |
| 2005/0057097 | A1 | | 3/2005 | Wu et al. |
| 2008/0176688 | A1 | | 7/2008 | Sakura et al. |

FOREIGN PATENT DOCUMENTS

| | | |
|---|---|---|
| JP | H0854051 A | 2/1996 |
| JP | H0953664 A | 2/1997 |
| JP | H10297854 A | 11/1998 |
| JP | 2001027307 A | 1/2001 |
| JP | 2007211836 A | 8/2007 |
| KR | 1020040026966 A | 4/2004 |
| WO | 03081084 A1 | 10/2003 |

OTHER PUBLICATIONS

Chinese Office Action dated Oct. 30, 2017 ; Application No. 201480010688.X; Applicant: BorgWarner Inc.; 24 pages.

Japanese Office Action dated Oct. 9, 2018 ; Application No. 2015-560209; Applicant: BorgWarner Inc.; 9 pages.

* cited by examiner

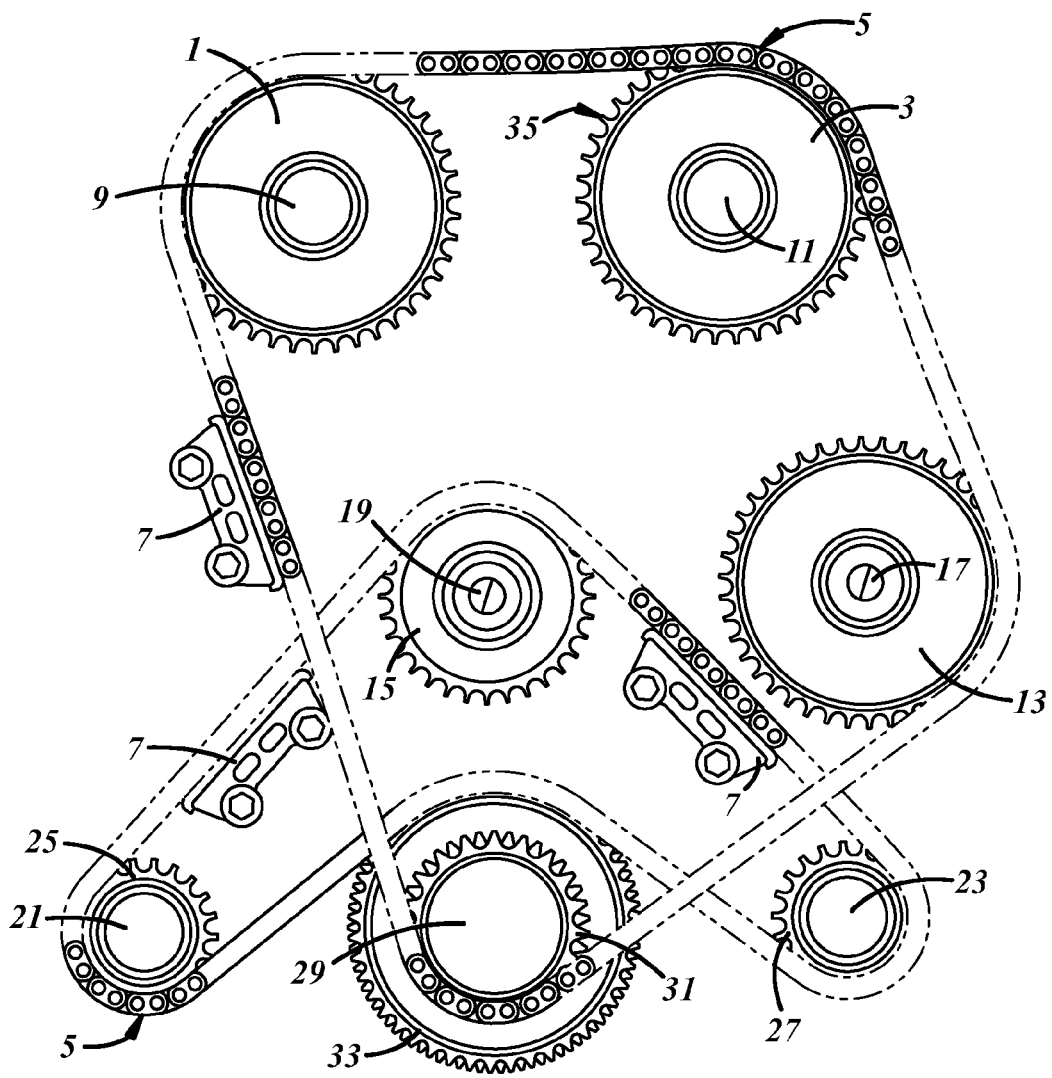
FIG. 1
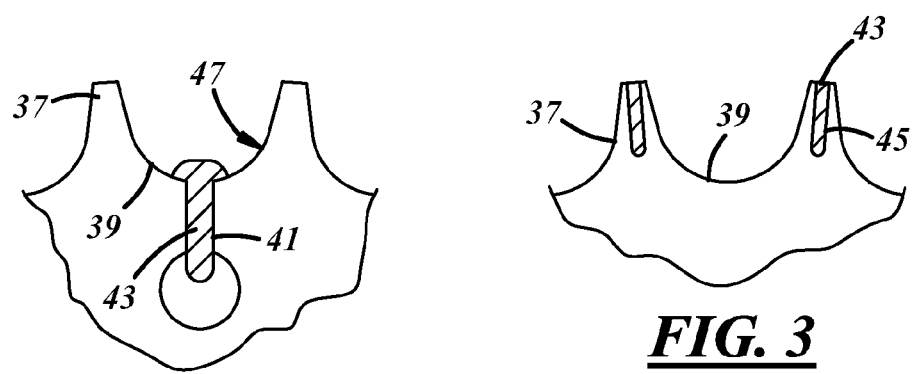
FIG. 2
FIG. 3

NOISE, VIBRATION, AND HARMONICS REDUCING SPROCKET TECHNOLOGY

CROSS-REFERENCE TO RELATED APPLICATIONS

This application claims the benefit of U.S. Provisional Application Ser. No. 61/771,300 filed Mar. 1, 2013.

TECHNICAL FIELD

The field to which the disclosure generally relates to includes a variation of technology to be incorporated into a sprocket which focuses on both airborne and structural noise to effectively lower the timing systems overall noise, vibration, and harmonics (NVH).

BACKGROUND

Sprockets may be used in a variety of applications including but not limited to automotive timing chain systems.

SUMMARY OF ILLUSTRATIVE VARIATIONS OF THE INVENTION

One variation of the invention may include a sprocket having one or more axial slots of any shape, size, and depth, and may be located anywhere along the tooth profile; a compressive or elastic material may be filled in the slots at any depth or extending proud of the tooth profile.

Another variation of the invention may include a sprocket having a radial slot through the tooth row; the radial slot could be any shape, size, and depth, and located anywhere on the tooth profile; a compressive or elastic material may be filled in the radial slot at any depth or extending proud of the tooth profile.

Another variation of the invention may include a sprocket having one or more axial slots of any shape, size, and depth, and may be located anywhere on the tooth profile, and having a radial slot of any size, shape, and depth, and at any location on the tooth row; the axial and radial slots may be filled with a compressive or elastic material at any depth or extending proud of the tooth profile.

Another variation of the invention may include a sprocket having one or more axial slots of any shape, size, and depth, and located anywhere on the tooth profile and having a radial slot of any size, shape, or depth and located anywhere on the tooth row and including technology to soften the impact of the chain guide links onto the sprocket placed on each side of the tooth row; the axial and radial slots may be filled with a compressive or elastic material at any depth or extending proud of the tooth profile.

Another variation of the invention may include a sprocket having a tooth row in two or more sections and having one or more a compressive or elastic components sandwiched between the tooth rows; a hub may be placed between the sprockets to create a double row sprocket.

Another variation of the invention may include a sprocket having a tooth row in two or more sections and having one or more compressive or elastic components sandwiched between the tooth rows; a cushion ring may be placed on each side of the tooth row along with a hub on each side of the tooth row.

Another variation of the invention may include a sprocket having a hub and isolation disk on each side of the tooth row; the bore of the sprocket having a larger diameter than the hubs and isolation disks.

Another variation of the invention may include a sprocket having a hub and isolation disk on each side of the tooth row held together by one or more mechanical fastener(s) which may be surrounded by one or more isolation ring(s); the bore of the sprocket having a diameter larger than the hubs and isolation disks.

Another variation of the invention may include a sprocket having a hub and an isolation disk which incorporates a cushion ring on each side of the tooth row which is held together by one or more mechanical fastener(s) which may be surrounded by one or more isolation ring(s); the bore of the sprocket having a diameter larger than the hubs and isolation disk incorporating a cushion ring.

Another variation of the invention may include a sprocket having a tooth row hub and a bore hub separated by an isolation material; the division of the tooth row hub and the bore hub may be in a spline type pattern.

Another variation of the invention may include a sprocket having a tooth row hub and two symmetric bore hubs with an isolation material separating the tooth row hub and the symmetric bore hubs; the isolation material may extend along the diameter of the symmetric bore hubs; the division of the tooth row hub and symmetric bore hubs may be in a spline type pattern.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein:

FIG. 1 is a schematic view of a multiple axis phased chain system including sprockets according to a number of variations of the invention.

FIG. 2 is a close-up view of the tooth row of the sprocket having an axial slot in the root of the sprocket filled with a compressive or elastic material according to a number of variations of the invention.

FIG. 3 is a close-up view of the tooth row of the sprocket having an axial slot in the tooth tip of the sprocket filled with a compressive or elastic material according to a number of variations of the invention.

DETAILED DESCRIPTION OF ILLUSTRATIVE VARIATIONS OF THE INVENTION

Figure 4:
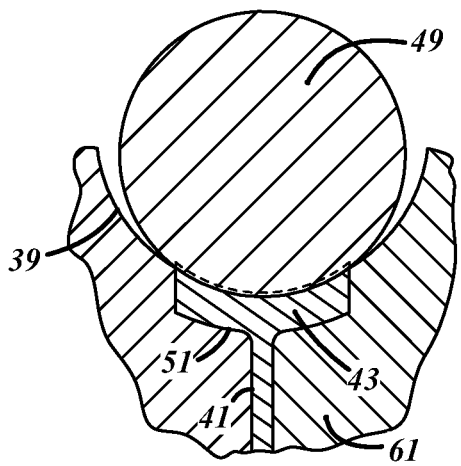
FIG. 4 is an example of how the root of the tooth may be configured to work with a compressive or elastic material according to a number of variations of the invention.

The following description of the variations is merely illustrative in nature and is in no way intended to limit the invention, its application, or uses.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

An example of a multiple axis timing chain system is illustrated in FIG. 1. The sprockets 1, 3, 13, 15, 25, 27, 31, 33 may be constructed according to any of a number of variations of the invention. Further, the sprockets 1, 3, 13, 15, 25, 27, 31, 33 according to any of a number of variations of the invention may be used with other types of chain drive systems.

A number of variations of the invention are illustrated in FIG. 1, and may include a crankshaft 29 that may provide output through a first crankshaft sprocket pair 31 and a second crankshaft sprocket pair 33. First crankshaft sprocket pair 31 may include a pair of phased sprockets. These two sprockets may both carry load or transmit power to chain assemblies (or chain pairs) 5. The chain assemblies 5 may provide the primary drive of a first overhead camshaft 9 and a second over camshaft 11. The chain assemblies 5 may provide the primary drive of the first overhead camshaft 9 and the second overhead camshaft 11. The first overhead camshaft 9 and the second overhead camshaft 11 may include a pair of phased sprockets. The chain assemblies 5 may also drive a first idler sprocket 13. The second crankshaft sprocket pair 33 may provide power transmission through chain assemblies 5 to a first balance shaft 21 and a second balance shaft 23, and a second idler shaft 19 and optionally, to an accessory drive, such as an oil pump drive (not shown). The chain assemblies of the multi-axis drive system shown in FIG. 1 utilize conventional snubbers 7 and tensioning devices to maintain tension and lateral control in various portions of the chain drive. Such devices are known to those skilled in the chain art.

A sprocket 1, 3, 13, 15, 25, 27, 31, 33 may be used in a variety of applications including a multiple axis phased timing chain system as shown in FIG. 1. These sprockets 1, 3, 13, 15, 25, 27, 31, 33 may reduce the noise, vibration, and harmonics associated with the impact between the sprocket 1, 3, 13, 15, 25, 27, 31, 33 and the chain assembly 5.

Referring to FIG. 2 and FIG. 3, a sprocket 1, 3, 13, 15, 25, 27, 31, 33 may include an axial slot 41 formed through one or more of the roots 39 of the sprocket 1, 3, 13, 15, 25, 27, 31, 33 and/or an axial slot 45 through one or more of the tooth tips 37 of the sprocket 1, 3, 13, 15, 25, 27, 31, 33. The axial slot(s) 41 and 45 may be in a plurality of shapes and sizes and may be placed at any location along the tooth profile 47. In certain variations, the axial slots 41 and 45 shown in FIG. 2 and FIG. 3 may allow the tooth row 35 to flex, which may lessen the impact of the chain assembly. Additionally, a compressive or elastic material 43 may be placed (such as injection molded) in the axial slots 41, 45 to further absorb noise vibrations. Furthermore, the compressive or elastic material 43 may be shallow or flush with the tooth profile 47 or extended proud of the tooth profile 47 as shown in FIG. 2 to help dampen the impact of the chain pin 49.

Referring to FIG. 4, in a number of variations of the invention the root 39 of the tooth row 35 may be configured with a groove 51 between adjacent teeth so that a compressive or elastic material 43 may be placed into the groove 51 so that when the chain pin 49 engages the root 39, the chain pin 49 pushes the compressive or elastic material 43 into the groove 51 and the chain pin 49 comes to rest on the root 39 profile which may dampen the impact of the chain assembly 5.

Figure 5:
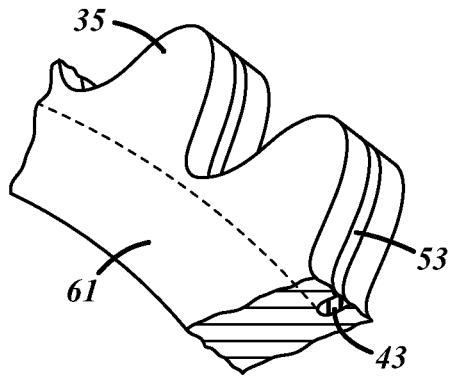
FIG. 5 is a sectional view of a sprocket having a radial slot in the tooth row and compressive or elastic material in the radial slot according to a number of variations of the invention.
Figure 6:
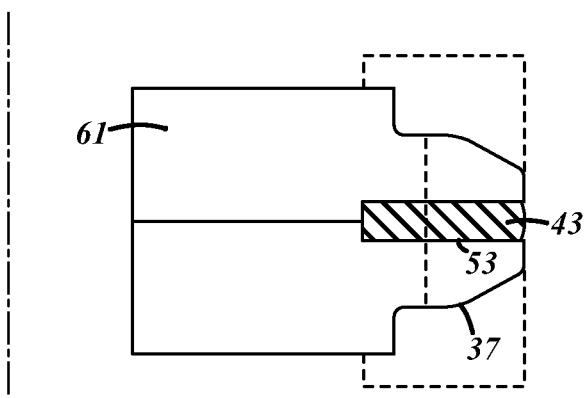
FIG. 6 is a sectional view of a sprocket having a radial slot in the tooth row and compressive or elastic material in the slot according to a number of variations of the invention.

Referring to FIGS. 5-6, in a number of variations, a sprocket 1, 3, 13, 15, 25, 27, 31, 33 may be formed with a radial slot 53 in the tooth row 35 of the sprocket 1, 3, 13, 15, 25, 27, 31, 33. The radial slot 53 may be placed at any depth, such as stopping in the tooth 37, or extending past the root 39 diameter and into the sprocket body 61. Turning the tooth row 35 into a plurality of tooth rows 55 and 57 may have multiple effects on the chain assembly 5 and the sprocket 1, 3, 13, 15, 25, 27, 31, 33 including changing the harmonics, to lowering the friction between the chain assembly 5 and the sprocket 1, 3, 13, 15, 25, 27, 31, 33 by lessening the surface area. The radial slot 53 in the tooth row 35 may be filled with a compressive or elastic material 43 to further reduce NVH caused from the impact of the sprocket 1, 3, 13, 15, 25, 27, 31, 33 with the chain assembly 5 as shown in FIGS. 5-6. The compressive or elastic material 43 may be shallow, flush, or proud of the tooth profile 47 to dampen the impact of the chain pin 49. FIGS. 5-6 illustrate variations which may include a radial slot 53 formed in the tooth row 35 with the compressive or elastic material 43 flush with the tooth row 35.

There are a variety of ways to implement the radial slot 53 and the optional compressive or elastic material 43 into the sprocket 1, 3, 13, 15, 25, 27, 31, 33, illustrative variations of which are shown in FIGS. 5-6, FIG. 10, and FIGS. 7-8 which will be discussed below.

Referring to FIG. 5 and FIG. 6, the radial slot 53 may be machined into the tooth row 35. The radial slot 53 may then be filled with a compressive or elastic material 43 as shown in FIG. 5 and FIG. 6.

Figure 8:
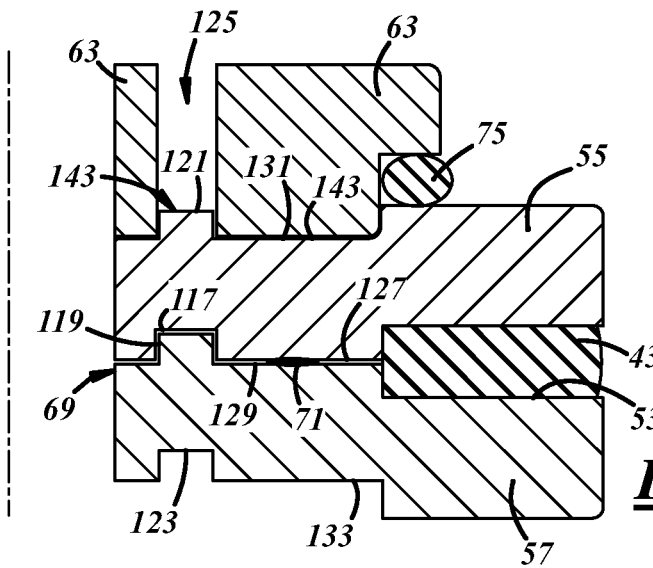
FIG. 8 depicts several variations to assembling a sprocket having a compressive or elastic material sandwiched between two sections of a tooth row, a hub, and an optional cushion ring according to a number of variations of the invention.
Figure 9:
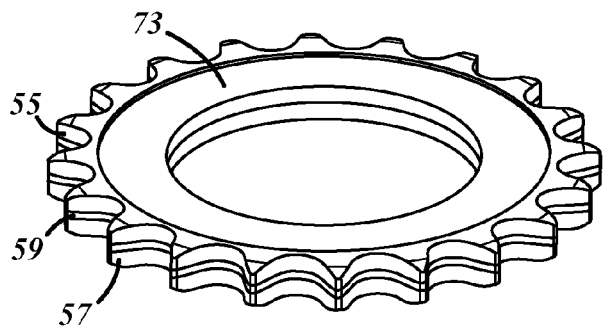
FIG. 9 is an overall view of a sprocket having a compressive or elastic material sandwiched between two sections of a tooth row according to a number of variations of the invention.
Figure 10:
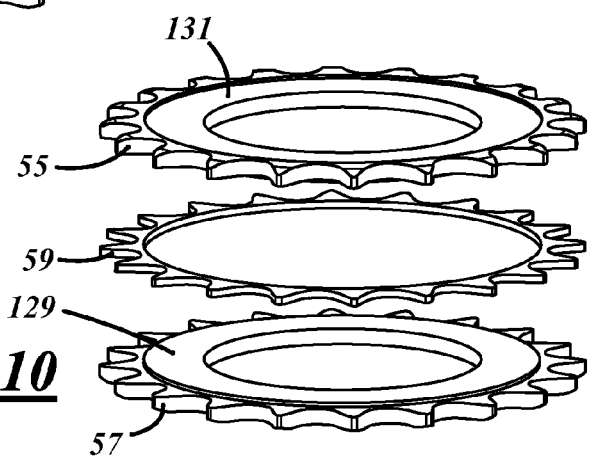
FIG. 10 is an exploded view of a sprocket demonstrating a sandwich method of assembly to incorporate a compressive or elastic material sandwiched between two tooth rows according to a number of variations of the invention.

Referring to FIGS. 9-10, a sandwich method of assembly may be used to assemble the sprocket 1, 3, 13, 15, 25, 27, 31, 33 having a radial slot 53 in the tooth row 35. The tooth row 35 may be split into a first tooth row 55 and a second tooth row 57, as shown in FIG. 10. Any variety of manufacturing processes, including but not limited to fineblanking, may be used to form the first tooth row 55 and the second tooth row 57. In a number of variations the sprocket 1, 3, 13, 15, 25, 27, 31, 33 including the first tooth row 55 and second tooth row 57 may be a single, unitary continuous piece. A compressive or elastic material 43 may be produced as a separate compressive or elastic component 59 which may then be sandwiched in between the first tooth row 55 and second tooth row 57 also shown in FIGS. 9-10, which may reduce costs by eliminating the need for injection molding which is more costly. The first tooth row 55 may have a protrusion 127 on its underside and the second tooth row 57 may have a protrusion 129 on its top portion. The compressive or elastic component 59 may then be placed around the first and second tooth row protrusions 127, 129. When the first and second tooth row protrusions 127, 129 meet, the compressive or elastic component 59 may be held in place around the protrusions 127, 129. FIG. 8 shows a sectional view of a sprocket 1, 3, 13, 15, 25, 27, 31, 33 made by using the sandwich method of assembly. A locking feature 69 may be used when using the sandwich method of assembling a sprocket 1, 3, 13, 15, 25, 27, 31, 33 to align the components, an illustrative variation of which is shown in FIG. 8. The locking feature 69 may include a notch 117 on the underside of the first tooth row 55 which aligns with a mating protrusion 119 on the top portion of the second tooth row 57. When the notch 117 on the underside of the first tooth row 55 engages the mating protrusion 119 on the top portion of the second tooth row 57, the first and second tooth rows 55, 57 may be locked in place.

Figure 11:
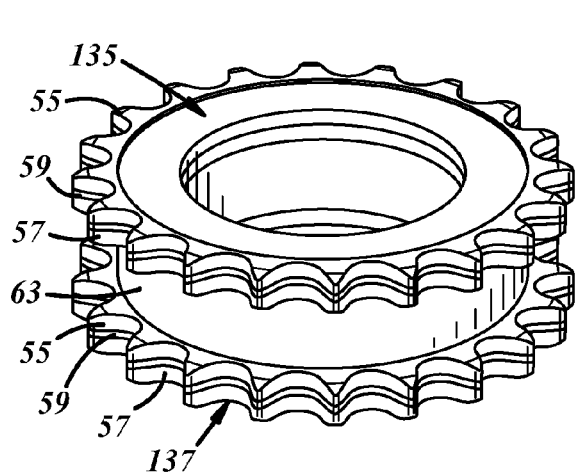
FIG. 11 is an overall view of a double row sprocket with each sprocket comprised of a compressive or elastic component sandwiched between two tooth rows according to a number of variations of the invention.
Figure 12:
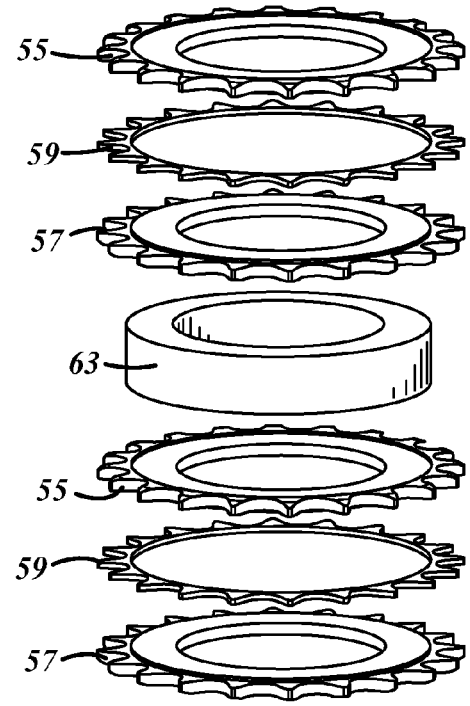
FIG. 12 is an exploded view of a double row sprocket demonstrating a sandwich method of assembly to incorporate a hub sandwiched between two sprockets each having a compressive or elastic material sandwiched between two tooth rows according to a number of variations of the invention.

Additionally, one or more hub(s) 63 may be added to the sprocket 1, 3, 13, 15, 25, 27, 31, 33. The hub 63 may act as a spacer to add additional tooth rows 35 to the sprocket 1, 3, 13, 15, 25, 27, 31, 33 to form a double row sprocket, an illustrative variation of which is shown in FIGS. 11-12. The first sprocket 135 may have a recess 133 on the underside of the second tooth row 57 sized to fit a mating hub 63 while the second sprocket 137 may have a recess 131 on the top portion of the first tooth row 55 sized to fit a mating hub 63. The hub 63 may then be sandwiched between a first sprocket 135 and second sprocket 137 which may create a double row sprocket. A locking feature 143 may also be used to align the hub 63 to one or more sprockets 1, 3, 13, 15, 25, 27, 31, 33, an illustrative variation of which is shown in FIG. 8. The hub 63 may have a through hole 125 which aligns with a first or second tooth row notch 117, 123.

Figure 13A:
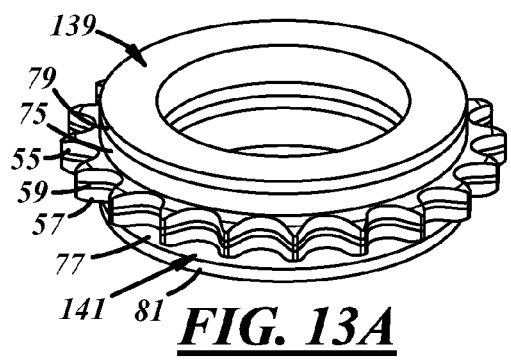
FIG. 13a is an overall view of a sprocket having a compressive or elastic component sandwiched between a first and second tooth row, a first and second cushion ring, and a first and second hub according to a number of variations of the invention.
Figure 13B:
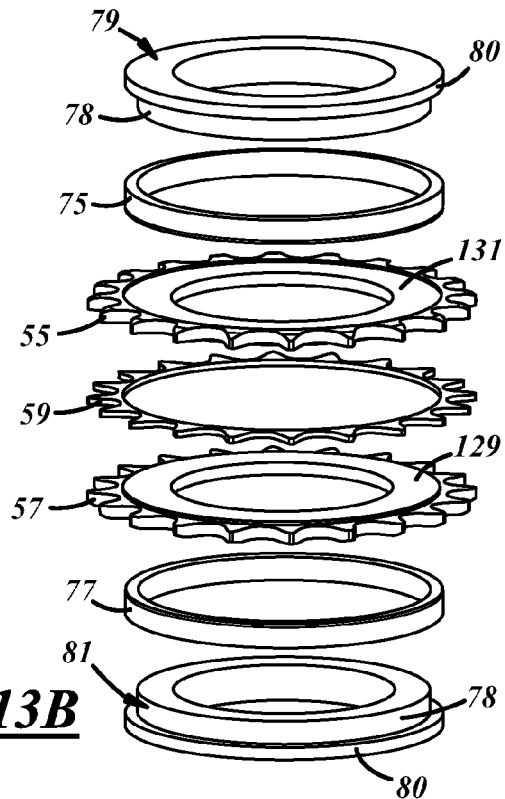
FIG. 13b is an exploded view of a sprocket demonstrating a sandwich method of assembly to incorporate a compressive or elastic component sandwiched between a first and second tooth row, a first and second cushion ring, and a first and second hub according to a number of variations of the invention.

Referring to FIGS. 13a-13b, in a number of variations, the sandwich assembly method may also be used to make a sprocket 1, 3, 13, 15, 25, 27, 31, 33 having a compressive or elastic material 43 radially in the tooth row 35 as well as with a compressive or elastic material 43 added to the sprocket body to dampen the impact of the chain guide link. A compressive or elastic component 59 may be sandwiched between a first tooth row 55 having an underlying protrusion 127 and a second tooth row 57 having a protrusion 129 on its top portion which mates with the compressive or elastic component 59. A first cushion ring 75 may then be mated to a first hub 79 having an annular portion 80 with a lip 78 extending therefrom, which is sized to accept the first cushion ring 75 creating a first hub and cushion ring assembly 139. A second cushion ring 77 may be mated with a second hub 81 having an annular portion 80 with a lip 78 extending therefrom, which is sized to accept the second cushion ring 77 creating a second hub and cushion ring assembly 141. The first hub and cushion ring assembly 139 may then be attached to the first tooth row 55 by fitting it in a recess 131 located on the top portion of the first tooth row 55. The second hub and cushion ring assembly 141 may be attached to the second tooth row 57 by fitting it in a recess 133 located on the underside of the second tooth row 57. Another variation may be to size the lip 78 of the first and second hub 79, 81 to extend over the sprocket 1, 3, 13, 15, 25, 27, 31, 33 bore surface in order to isolate the sprocket 1, 3, 13, 15, 25, 27, 31, 33 from the shaft 9, 11, 17, 19, 21, 23, 29 which may further lower the NVH, as will be discussed below.

Figure 7:
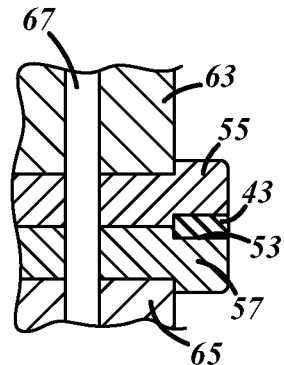
FIG. 7 is a sectional view of a sprocket having a radial slot in the tooth row filled with a compressive or elastic material in the radial slot and press fitted together with a top and bottom hub secured together with a mechanical fastener according to a number of variations of the invention.

The separate components may be assembled in a plurality of ways, including but not limited to: welding as shown in FIG. 8, pressing several pins around the sprocket 1, 3, 13, 15, 25, 27, 31, 33 as shown in FIG. 7, pressing a central bushing/cylinder (not shown), or simply allowing the engine mating bolt to hold them together. Further, a number of aligning features may be incorporated into the components to poka yoke the assembly.

Figure 14:
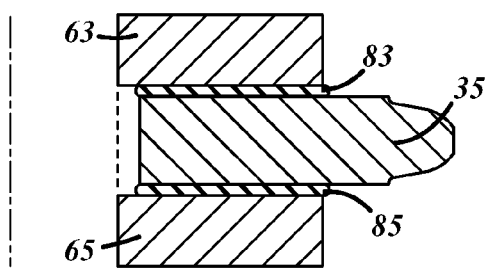
FIG. 14 is a sectional view of a sprocket having a first and second isolation disk and a first and second hub on each side of the tooth row and having a tooth row bore diameter larger than the bore diameter of the isolation disks and hubs to separate the tooth row from the shaft according to a number of variations of the invention.
Figure 16:
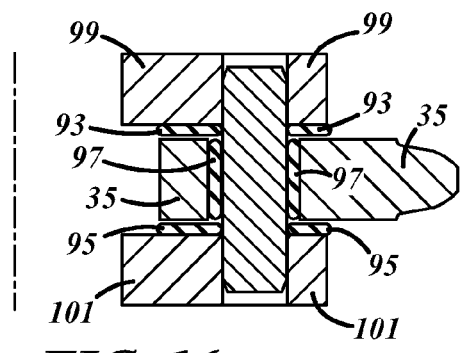
FIG. 16 is a sectional view of a sprocket incorporating a mechanical fastener with an isolation ring used to assemble a tooth row with an isolation disk and hub on each side of the tooth row according to a number of variations of the invention.
Figure 15:
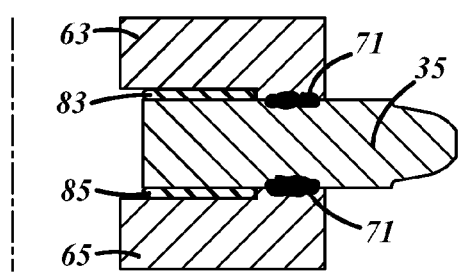
FIG. 15 is a sectional view of a sprocket having a first and second isolation disk and a first and second hub on each side of the tooth row, and having a tooth row bore diameter larger than the hub to separate the tooth row from the shaft, and demonstrating an option of spot welding according to a number of variations of the invention.
Figure 17:
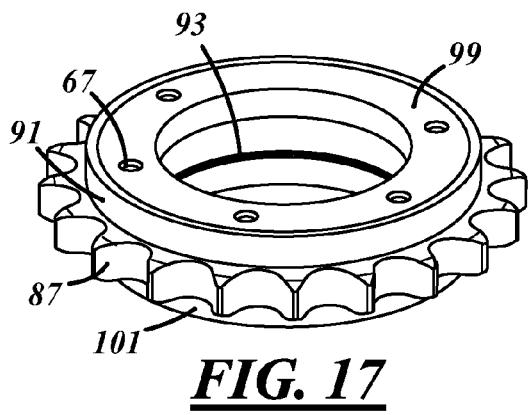
FIG. 17 is a perspective view of a sprocket having a tooth row sandwiched between an isolation disk (or isolation disk incorporating a cushion ring) and a hub on each side of the tooth row, which is assembled by using a mechanical fastener which has an isolation ring surrounding the mechanical fastener according to a number of variations of the invention.
Figure 18:
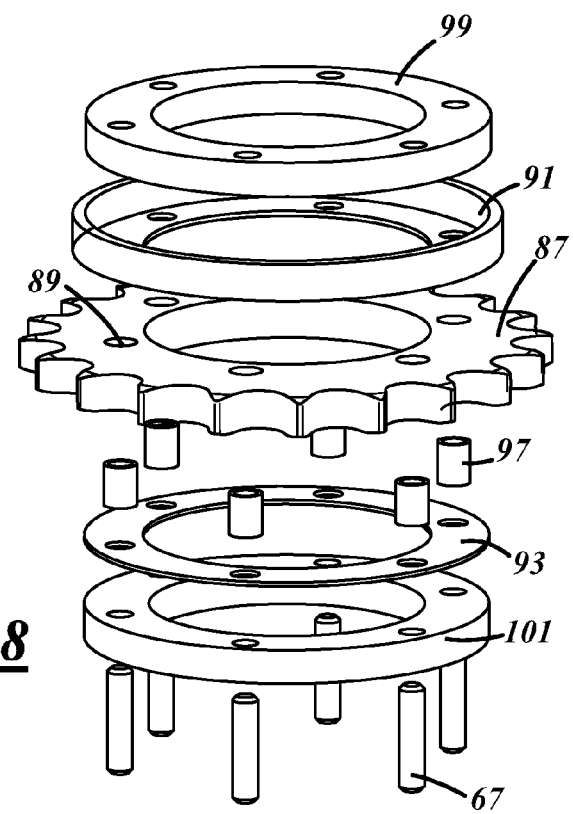
FIG. 18 is an exploded view of a sprocket demonstrating the use of a sandwich method of assembly to incorporate a tooth row sandwiched between two isolation disks (or isolation disks incorporating a cushion ring) and two hubs which is secured together using mechanical fasteners which are to be surrounded by isolation rings according to a number of variations of the invention.
Figure 19:
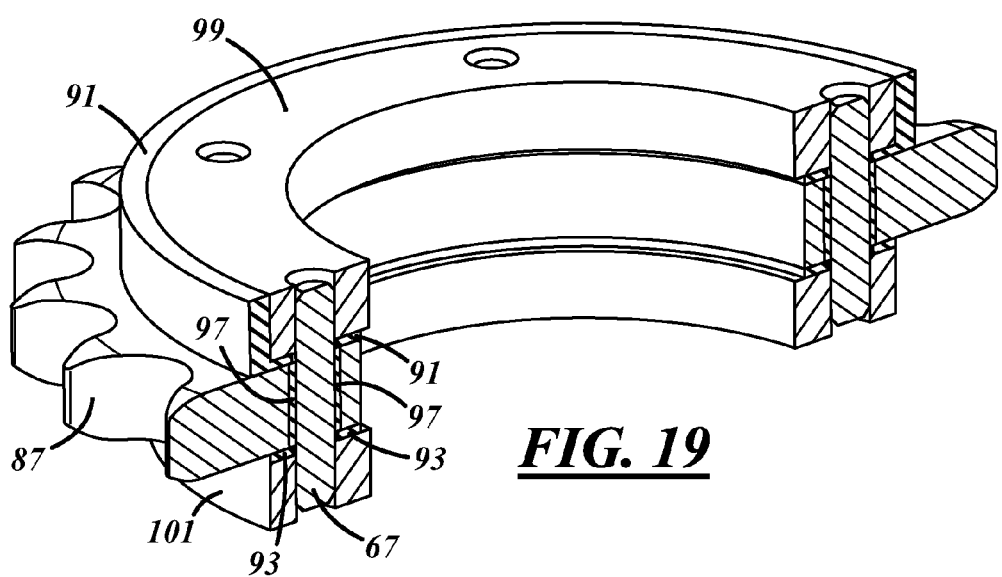
FIG. 19 is a cut view of a sprocket having a tooth row sandwiched between two isolation disks (or isolation disks incorporating a cushion ring) and two hubs and is secured together using mechanical fasteners which are surrounded by isolation rings and having a tooth row bore diameter larger than the hubs and isolations disks (or isolation disks incorporating a cushion ring) according to a number of variations of the invention.

Another method to reduce the NVH of the sprocket 1, 3, 13, 15, 25, 27, 31, 33 and chain assembly 5 may be to isolate the vibrations created from the chain pin 49 to sprocket 1, 3, 13, 15, 25, 27, 31, 33 impact to prevent the vibrations from traveling into the shaft 9, 11, 17, 19, 21, 23, 29. This may be done by isolating the sprocket row 1, 3, 13, 15, 25, 27, 31, 33 from the shaft 9, 11, 17, 19, 21, 23, 29 by incorporating a sprocket 1, 3, 13, 15, 25, 27, 31, 33 sandwiched between a first isolation disk 83 and a second isolation disk 85 and between a first hub 63 and second hub 65 each having a smaller bore diameter than the tooth row bore so that the tooth row 35 may not touch the shaft 9, 11, 17, 19, 21, 23, 29, an illustrative variation of which is shown in FIG. 14. The first hub 63 and second hub 65 may contain keys, or other features to orientate the sprocket 1, 3, 13, 15, 25, 27, 31, 33 for proper timing. The sprocket 1, 3, 13, 15, 25, 27, 31, 33 may be attached to the first hub 63 and second hub 65 by using spot welding 71, an illustrative variation of which is shown in FIG. 15, however, this may allow the vibration to pass through to the shaft 9, 11, 17, 19, 21, 23, 29.

Another option for assembly may be to press fit one or more mechanical fastener(s) such as one or more dowel pin(s) 67 through a first and second hub 99, 101, a first and second isolation disk 93, 95, and a tooth row 87, each having one or more holes for accepting one or more mechanical fastener(s) 67, illustrative variations of which are shown in FIGS. 16-19. The tooth row holes 89 may be sized to have clearance around the mechanical fastener 67 which may also be filled with an isolation material 109 or an isolation ring 97. Additionally, the first isolation disk 91 and second isolation disk 93 may each incorporate a cushion ring 75, 77 to create one component 91 which may function as an isolation disk 91, 93 and a cushion ring 75, 77, a number of variations being illustrated by FIGS. 17-19. This concept is not limited to a press fit dowel pin assembly method, bolts or other fastening techniques may be used to attach the sprocket 1, 3, 13, 15, 25, 27, 31, 33 to the first hub 99 and second hub 101. For example, the traditional shaft assembly technique of putting the sprocket 1, 3, 13, 15, 25, 27, 31, 33 over a large shaft nose and clamping with a single bolt to carry the load may be obsoleted and the shaft nose may be turned down so it is only used for alignment and multiple bolts could be used through the dowel pin holes for carrying the load. Or the nose may be eliminated altogether to make an even smaller sprocket.

Figure 20:
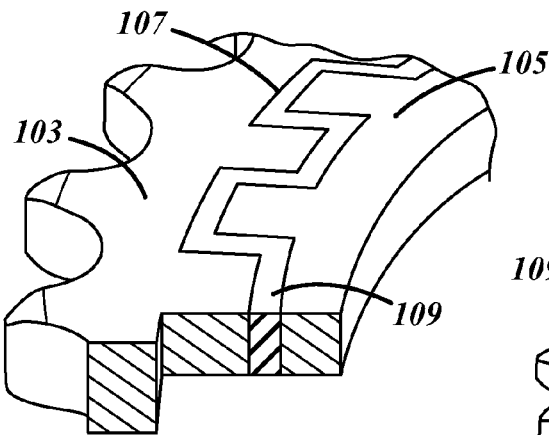
FIG. 20 is a sectional view of a sprocket having an isolation material separating the tooth row hub from the bore hub according to a number of variations of the invention.
Figure 21:
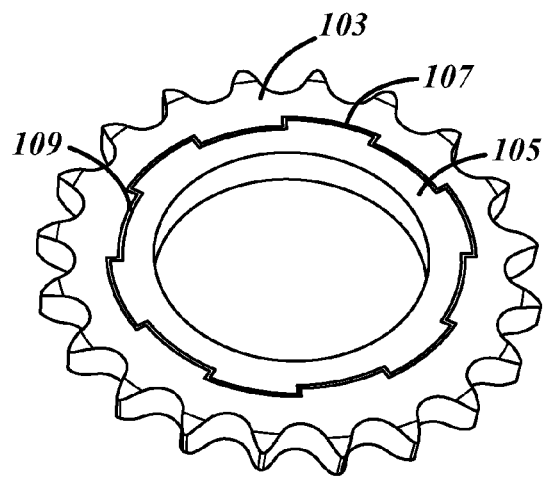
FIG. 21 is a perspective view of a sprocket having an isolation material separating the tooth row hub from the bore hub according to a number of variations of the invention.
Figure 23:
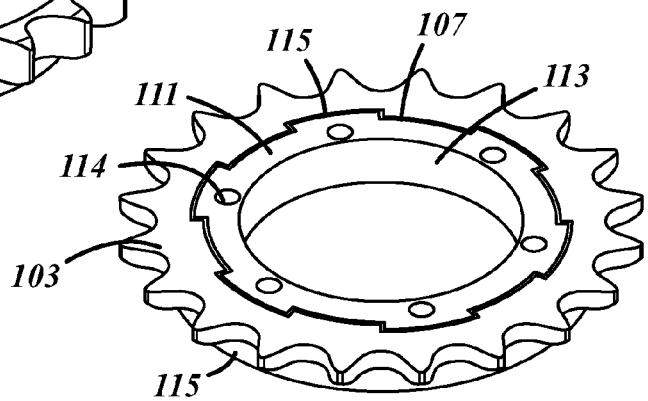
FIG. 23 is a cut view of a sprocket having a tooth row hub separated from a first and second bore hub with an isolation material extending over the perimeter of the first and second bore hubs according to a number of variations of the invention.

Another method to isolate the vibrations created from the chain assembly 5 to sprocket 1, 3, 13, 15, 25, 27, 31, 33 impact with fewer components may be to separate the tooth row hub 103 from the bore hub 105 with an isolation material 109, a number of illustrative variations of which are illustrated by FIGS. 20-21. A spline type pattern 107 may be used to help control the position of the tooth row hub 103 to any timing feature that may be incorporated in the bore hub 105 as shown in FIGS. 20-21, and FIG. 23. Additionally, the spline type pattern 107 may prevent the bore hub 105 or tooth row hub 103 from breaking free of the other components. There are a variety of ways for the isolation material 109 to be put into place including, but not limited to, press fitting and injection molding.

Figure 22:
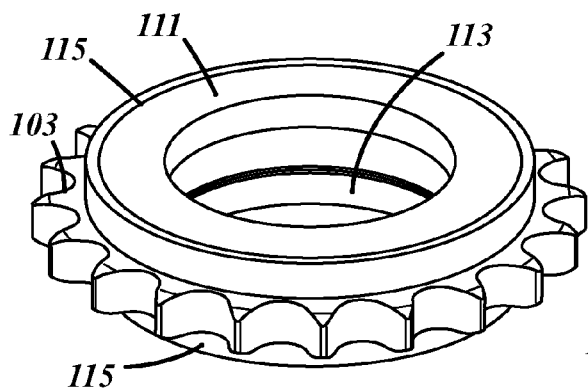
FIG. 22 is a perspective view of a sprocket having a tooth row hub separated from a first and second bore hub with an isolation material separating the tooth row hub and the first and second bore hubs and extending over the perimeter of the hubs according to a number of variations of the invention.
Figure 24:
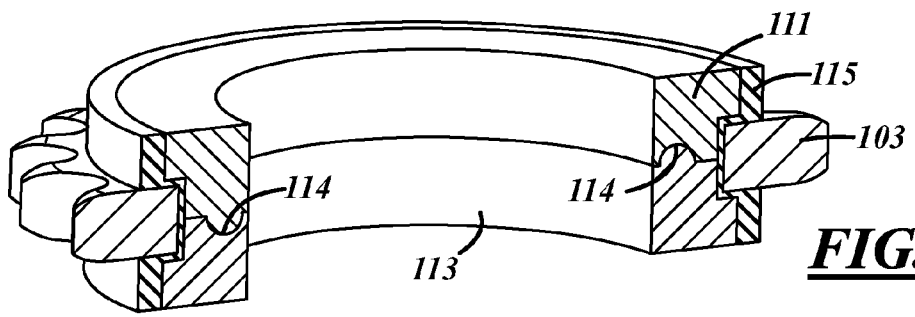
FIG. 24 is a sectional view of a sprocket having a tooth row hub separated from a first and second bore hub having tongue and groove technology with an isolation material and extending over the perimeter of the first and second hubs according to a number of variations of the invention.

In order to address any Z axis concerns of the chain assembly 5 pulling the tooth row hub 103 out of parallel to the bore hub 105, symmetric first and second bore hubs 111, 113 may be used, as shown in FIGS. 22-24. The isolation material used to separate the tooth row hub 103 and the first and second bore hubs 111, 113 may be extended over the first and second bore hubs 111, 113 to create cushion rings 75, 77. This sprocket 1, 3, 13, 15, 25, 27, 31, 33 may be assembled in a variety of ways, including, but not limited to, press fitting the first and second hubs 111,113, sinter bonding the first and second hubs 111, 113 together and injection molding the isolation material 109 while the sprocket 1, 3, 13, 15, 25, 27, 31, 33 is suspended in the mold tooling, frictional welding, or having a tongue and groove joint 114 between the first and second hubs 111, 113 which may be snapped together and having the tooth row hub 103 and first and second bore hub 111,113 separation isolation material 109 and cushion rings 75,77 made into one component 115 which may be assembled with the first and second tongue and groove hubs 111,113, as shown in FIGS. 23-24.

The following descriptions of number variations are illustrative and are not intended to limit the scope of the invention.

The above description of select examples of the invention is merely exemplary in nature and, thus, variations or variants thereof are not to be regarded as a departure from the spirit and scope of the invention.

What is claimed is:

1. A product comprising:
    a sprocket having a plurality of teeth formed along a perimeter of a sprocket body;
    the plurality of teeth separated by a plurality of roots along the perimeter of the sprocket body;
    the sprocket body having a bore formed in a center thereof;
    a slot formed through the sprocket body, the slot having a channel portion being defined in-part by a pair of parallel surfaces in the body extending from the root and by a bulbous portion defined by a surface of the body that connects to both of the parallel surfaces, wherein the bulbous portion has a width greater than a width of the channel portion, and further comprising an elastic material received in at least a portion of the slot and wherein the elastic material extends within an entire area of the channel portion and within only a portion of the bulbous portion.

2. The product of claim 1, wherein the channel portion includes a first end and a second end opposite of the first end and a length that extends from a profile of the root toward the center of the sprocket body, wherein the first end of the channel portion is adjacent the profile of the root, and wherein the bulbous portion extends from the second end of the channel portion.

3. A product comprising:
- a sprocket having a plurality of teeth formed along a perimeter of a sprocket body;
- the plurality of teeth, wherein adjacent teeth are separated by a root;
- the sprocket body having a bore formed in a center thereof;
- at least one slot formed in the sprocket, the at least one slot having a channel portion being defined in-part by a pair of parallel surfaces in the body extending from the root and by a bulbous portion defined by a surface of the body that connects to both of the parallel surfaces, and further comprising a compressive or elastic material inserted into the slot, and wherein the compressive or elastic material extends within an entire area of the channel portion and within only a portion of the bulbous portion.

* * * * *